May 5, 1964 F. S. SCHADE 3,131,485
MASKING MEANS FOR "PROGRAM TEACHING" BINDERS
Filed July 7, 1961 3 Sheets-Sheet 1

INVENTOR
FRANK STANLEY SCHADE
BY Chapin + Neal
ATTORNEYS

May 5, 1964    F. S. SCHADE    3,131,485
MASKING MEANS FOR "PROGRAM TEACHING" BINDERS
Filed July 7, 1961    3 Sheets-Sheet 2
FIG_2
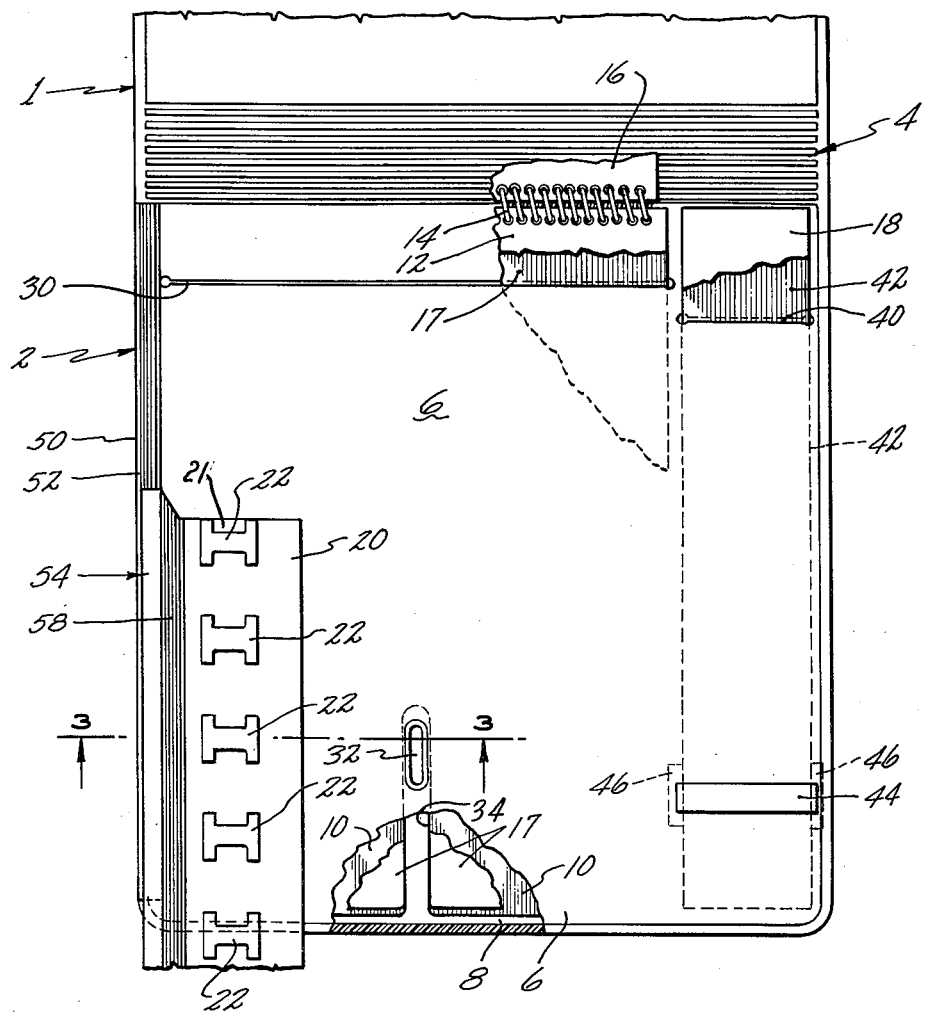
FIG_3
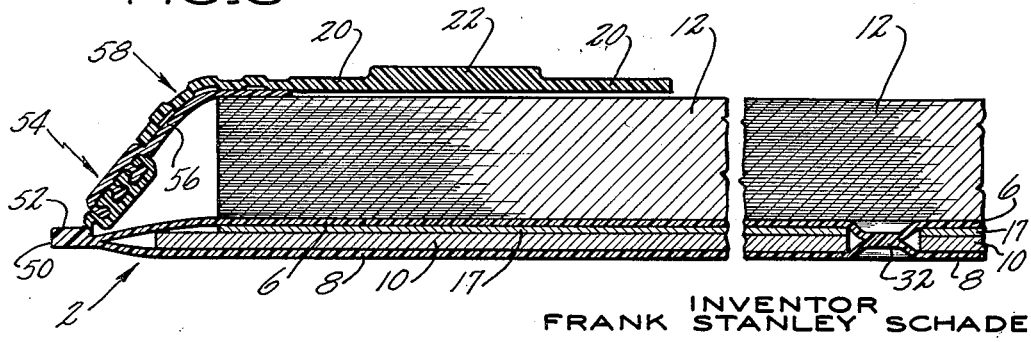
INVENTOR
FRANK STANLEY SCHADE
BY Chapin + Neal
ATTORNEYS May 5, 1964 F. S. SCHADE 3,131,485
MASKING MEANS FOR "PROGRAM TEACHING" BINDERS
Filed July 7, 1961 3 Sheets-Sheet 3
FIG_4
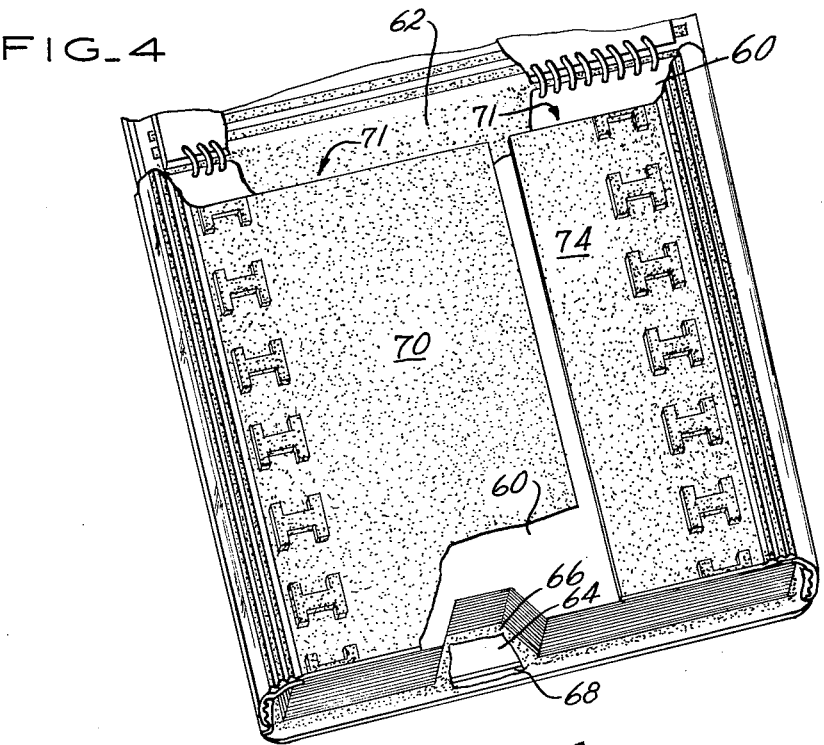
FIG_5
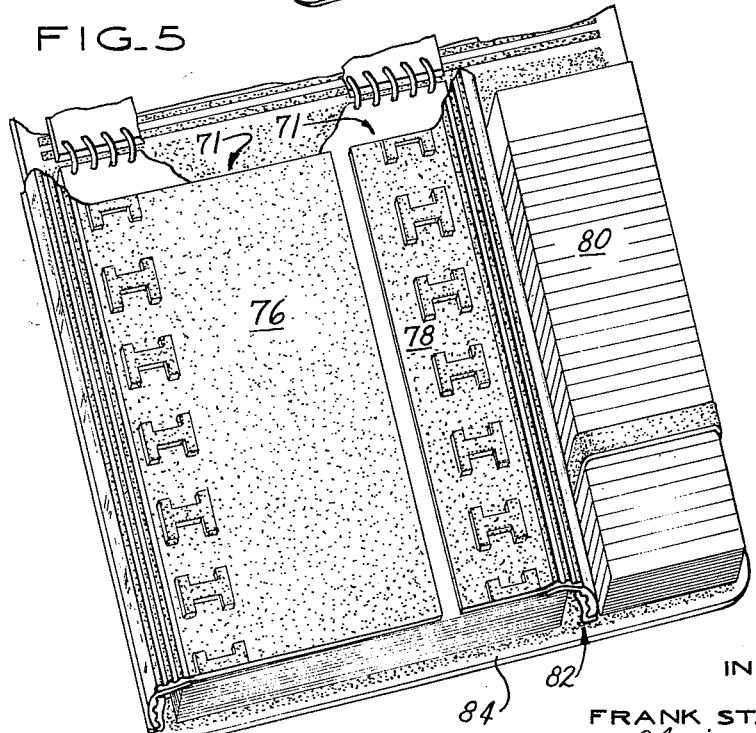
INVENTOR
FRANK STANLEY SCHADE
BY Chapin & Neal
ATTORNEYS

United States Patent Office 3,131,485
Patented May 5, 1964

3,131,485
MASKING MEANS FOR "PROGRAM TEACHING" BINDERS
Frank Stanley Schade, Holyoke, Mass., assignor to National Blank Book Company, Holyoke, Mass., a corporation of Massachusetts
Filed July 7, 1961, Ser. No. 123,949
7 Claims. (Cl. 35—9)

This invention relates to a masking means for binders intended for "program teaching" or "program learning" use and the like.

This is a continuation-in-part of application Serial No. 115,413, filed June 7, 1961, now abandoned.

Of growing importance in the field of education in schools etc. is the use of various and sundry teaching aids to accelerate the learning processes of pupils and students. Much research and study has been done by educational experts and psychologists in the effort to determine the way in which people learn and the best methods by which they can be taught to the greatest advantage. From this type of research there has developed a system now generally known as program teaching or program learning. In using the system it is believed that a person advances most rapidly and will be more actively interested in studying any subject provided the information to be learned is broken down into small sequential steps and incorporated in question and answer form which requires the student to think clearly and give a logical answer which can be verified at once before proceeding to a next logical step. In this way a pupil's concentration is focused on the content of each individual step and a sense of achievement is gained if the answer is correct. Further a student's knowledge that his thinking is in the right direction gives him confidence and adequately prepares him for the next succeeding steps. If an answer is wrong, the correct answer is available to re-orient a student's thoughts and thereby immediately give some measure of direction for the succeeding steps as well as to show the need for correction.

To serve the purposes of this type of learning a great variety of teaching aids have been proposed. Some machines for program teaching are rather elaborate devices of a "cheat-proof" nature for unattended pupil usage. Other machines even more complex have been developed on an experimental research basis. Most teaching aids of the machinery type are relatively expensive. An individual teacher may, of course, inexpensively use the system in an open classroom by orally presenting questions and answers to pupils as they write down their own answers. However, in the latter case one of the great advantages seen for this system is lost in that oral presentation does not free a school teacher, as the machines do, for other work which inherently requires individual attention.

The present invention is directed to a masking means combinable with a pad of bound sheets for use in program teaching and specifically to an attractive binder construction which is relatively inexpensive and extremely useful for such teaching methods. It demands very little or no attention on the part of an instructor. To be more specific the present invention is related to a binder construction in which printed "program" question and answer pages are conveniently mounted, the correct answers being successively uncovered by the student as he writes his answers to the questions. The student's answers, furthermore, may be written on a disposable sheet of a pad of blank paper, preferably mounted in the binder assembly or separate therefrom, so that the same set of printed program questions and answers can be used over and over again by many pupils.

An object of the invention is to provide an attractive but relatively inexpensive re-usable binder having a movable shield or flap or a pair of flaps, which may be manipulated to uncover step by step the correct answers of a series of questions or both the questions and answers which are successively arranged as on the pages of a printed booklet or bound stack of sheets.

An additional object is to provide a binder of the above described type having a separate columnar or vertically elongated pad of blank sheets which may be used for writing the answers required for any one of many different programmed question sheets. The blank pad thus enables each answer to be conveniently written beside the question to which it applies.

Another object is to provide a binder in which a bound pad of printed question sheets may be removably inserted so that the binder may be used for successive sets of inexpensively bound program papers. Thus, the bound programmed sets may be conveniently placed in storage for subsequent use with a miniumum of space requirements while during use the binders of this invention will protect the sets from becoming worn and dog eared by excessive handling.

The invention is characterized by a masking means in the form of a flexible flap which is combinable with a pad of bound sheets printed for program teaching use; a support for the pad with means to position the pad in pre-determined relation on the support, such support being provided by one of a pair of cover members; and the flexible masking flap removably covering at least a portion of the pad in any overlying relationship, the flap being also hingedly connected to the support with provision for sliding the flap parallel to the lateral edges of the pad.

The above and other objects and advantages will be apparent from the following description of the invention as shown by the accompanying drawings, in which:

FIG. 2 is a fragmentary plan view of the embodiment shown by FIG. 1 with portions cut way to illustrate various preferred constructional details of the illustrated binder;

FIG. 3 is a section on line 3—3 of FIG. 2 on a greatly enlarged scale to illustrate a preferred construction of a slidable attaching means for joining the masking flap to the binder panel edge; and FIGS. 4 and 5 are views similar to FIG. 1 showing two alternative embodiments of the invention.

Figure 1:
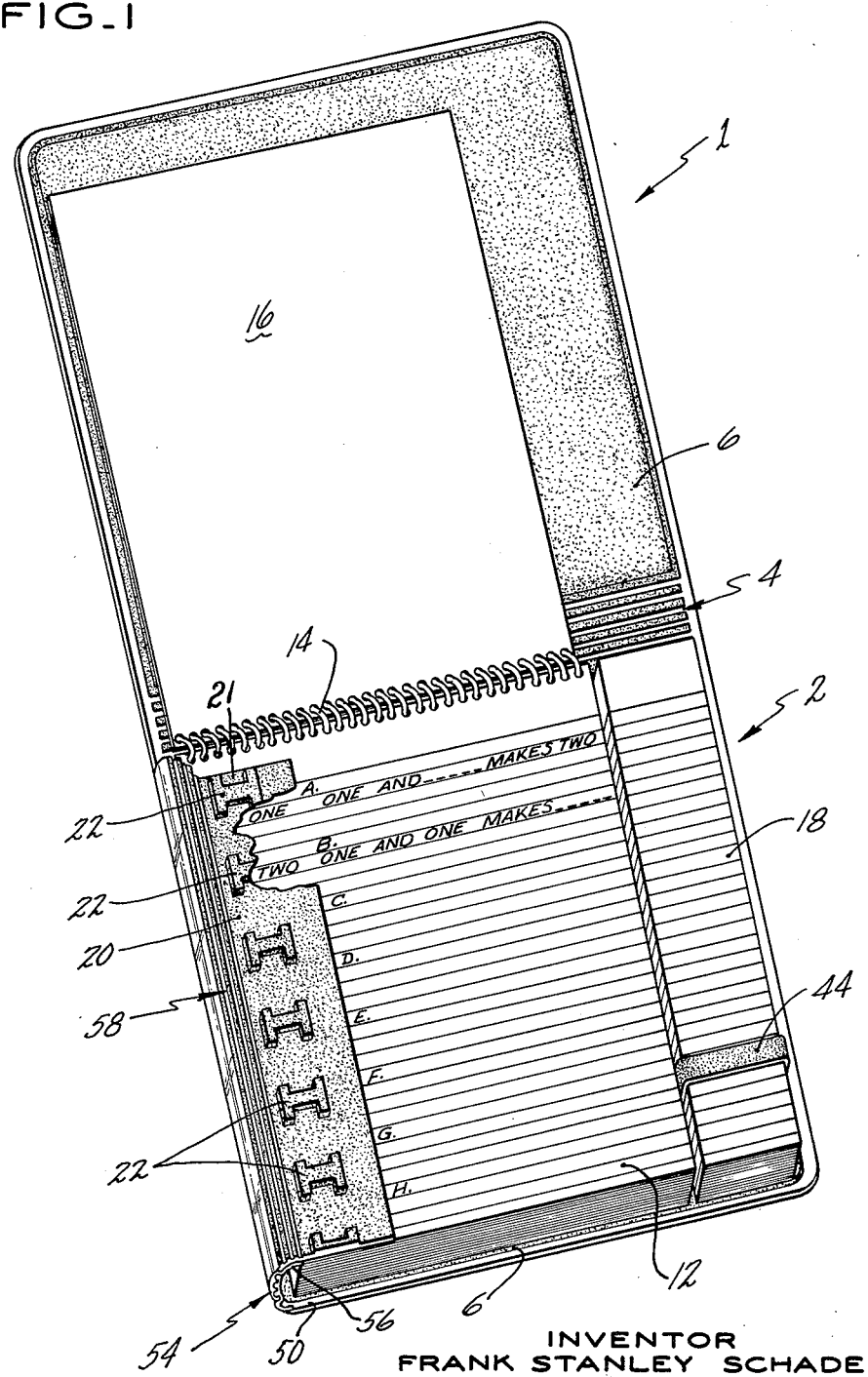
FIG. 1 is a pictorial view of a binder construction embodying the invention with the top cover thereof turned back to illustrate the arrangement of the various elements ready for use.

In FIG. 1 a binder embodying the invention is shown with two cover panels 1 and 2 hinged together as at the top side of the lower panel 2 by an integrally formed hinge portion at 4. Preferably the cover panels are integrally formed as by a pair of superposed thin sheets of heat sealable decorative plastic material having a pair of rectangular panel body or stiffening members of cardboard or the like enclosed between the decorative sheets. The cardboard members define the panel portions 1 and 2 and are secured in spaced relation by electronic welding or otherwise heat sealing the two plastic sheets around the edges of the members. This is a known construction, the plastic sheets being shown in FIG. 3 at 6 and 8 with the stiffener at 10 for the panel 2 encased between the sheets. The hinge portion 4 between the panels is formed by welding the inner facing portions of the thermoplastic sheets, the welding in this area being transversely ribbed for suitable hinge action.

As seen in FIG. 1 a bound stack or book 12 of printed pages containing programmed questions and answers is removably mounted on the panel 2. The pages are bound as by a spiral wire binding 14 between stiff cover members the top cover 16 being turned back to expose the first page. Book 12 overlies the panel 2 (which supports the book in predetermined relation as will be seen) from the edge thereof at the left to the inner side of a vertically elongated pad 18 of blank sheets of lined writing paper which is mounted in the marginal area along the opposite or right hand side of panel 2.

In a marginal position on the left side of the panel and corresponding to that of pad 18 in the example of FIG. 1 is a columnar masking shield or flap 20 which extends from the edge of the panel 2 to overlie a marginal area of the panel and the pages of the book 12. The flap 20 is connected to the panel edge by slidably engaged interconnecting means to be later described. The flap will slide back and forth parallel to the panel edge and thus may be moved downwardly to progressively uncover the marginal area of an underlying page. The flap is formed of a thin limply flexible plastic sheet material and may have the same decorative quality as the covering material of the panels. In longitudinally or vertically spaced relation on the upper surface of the flap are upraised portions 22 each preferably in the form of an H. These portions serve as abutments for finger manipulation of the flap in sliding it back and forth along the edge of the panel.

To those familiar with program teaching and learning it will be recognized that in using this form of unit a student will commence with the shield or masking flap 20 in its full marginal covering position. The printed questions will be visible on the exposed portion of a page. First, the student's answer to the printed question at the top is written on the top sheet of the pad 18. He then slides the flap downwardly to unmask the answer printed on the underlying margin of the page, checks his own answer and then goes on to the next question carrying out the same procedure until all questions are answered. The top sheet of the pad may then be torn from the pad in the usual manner and the flap moved back into its full masking position.

It is to be noted that the flap 20, being of limp plastic material and hingedly related as will be described, may remain in substantially full masking position while the topmost page of the book is turned on wire 14 to expose the next page. A top page may be handled with very little lifting of flap 20 by picking up the lower right corner of the page and swinging it outwardly in an arc and to the right over pad 18, while at the same time raising it slightly and folding the top part back to slip the upper left hand corner of the page out from under the top right hand corner of the flap. The upper edge of the flap at 21 is in a lowered offset position from the wire of the binding to assist the withdrawal of the topmost page in this manner. Thus the user may easily avoid inadvertent exposure of the printed answers on the new page of questions.

A further advantage of the limp character of the flap 20 will be appreciated when considering the fact that the binder will normally be used when sitting at a desk or table surface. Thus, the lower end portion of the flap 20 which will be sliding beyond the bottom edge of panel 2 may be turned downwardly to drape past the edge of a table surface and cause little if any interference with the user sitting near the table edge.

Referring now to FIG. 2 there is shown the pocket mounting means for releasably holding the spiral bound book 12 in predetermined position with respect to the supporting cover panel 2. Also shown is the means for retaining pad 18. The inner plastic sheet 6 of the panel 2 is cut as at 30 along a line parallel to the hinge connection of the covers and adjacent thereto to form a pocket between the sheet 6 and cardboard stiffener 10. At each end of the linear cut 30 a circular cut is provided to resist tearing of the material and to facilitate insertion of the bottom stiff cover member 17 of the book 12. In the lower portion of panel 2 centrally of the position to be occupied by the book 12 a small vertically slotted opening in stiffener 10 permits welding of the opposed sheets 6 and 8 in the slotted area. Thus a convenient "keeper" member 32 is provided for entering a slot at 34 extending upwardly from the lower edge of the cover member 17 of book 12. Thus the sides of the slot straddle the member 32 and the book will be maintained in its correctly centered position.

In the upper section of the marginal area at the right side of the panel the pocket for mounting pad 18 is formed by a cut at 40 similar to cut 30. Cut 40 forms the entrance for the usual cardboard backing member 42 of pad 18. In the lower section of this columnar marginal area 2 retaining loop 44 extends from the panel to encircle the sheets of paper of the pad and thus conveniently prevents the pad from shifting out of its proper vertical position. The ends of loop 44 extend through slits in the sheet 6 and are provided with laterally extending portions indicated at 46 which anchor the loop.

The slidable connecting means hingedly relating flap 20 to the edge of the cover panel 2 is shown in detail in FIG. 3. Welded integrally along the panel edge at 50 is the edge of a plastic strip 52. The strip 52 is formed as an extrusion having, in the form shown, the upper surface of its free edge portion provided with a longitudinal rib and groove construction. A slidable connection is shown at 54 with a mating strip extending from flap 20. Welded integrally along the inner edge at the underside of the flap 20 is a relatively wide strip 56 of extruded plastic material extending laterally of the edge of member 20. At the free outer portion of strip 56 the under surface is provided with a longitudinal rib and groove construction similar to that of the strip 52. The interfaces of the strip 52 and 56 overlap and are engaged to provide a smooth slidable connection whereby the flap 20 is movable to unmask the marginal area as described.

It will be noted that the attaching strip 56 extends in welded underlying relation to a ribbed flap edge portion 58 having an arched conformation. The flexible material of the strip 56 when welded in underlying relation to the ribbed section will result in a molded effect. This welded area being a two-ply construction is somewhat stiffer in character than the flexible material of the flap alone. Accordingly, the reinforcement in this ribbed area results in yieldably directing the limp material of the flap into a flat overlying contact against the top sheet of the book 12 and in maintaining this condition during use.

In FIGS. 4 and 5 two alternative embodiments of the invention are shown. In the binder of FIG. 4 a single spiral wire bound pack 60 of programmed pages with questions and answers printed thereon are held on a cover panel 62 by inserting the back cover member 64 of the bound pack between the plastic cover sheet 66 and stiffener member 68 in the same manner as described in connection with the binder shown by FIGS. 1–3. In the binder of FIG. 5 the binder construction is identical with that of FIGS. 1–3 with the exception of the dimension and disposition of the flexible masking flaps.

The embodiments shown by FIGS. 4 and 5 are similar to each other in respect of the positioning of the two masking flaps which are provided to cover both the question and answer columnar areas respectively. It is to be noted that in each instance the mask of lesser transverse dimension is at the right hand edge of the stack of sheets and is arranged to cover an answer column arranged adjacent that edge.

Thus in FIG. 4 the flap 70 covers a list of questions arranged in a columnar area extending from the left hand end edge of page 60. The flap 74 covers the list of answers ranked as a right hand column. In this binder form the user will first slide flap 70 downwardly to uncover a question, next write his answer either directly on page 60 or on a separate pad or sheet, and then by sliding flap 74 downwardly check the correctness of his answer. In successive steps this sequence and procedure is followed until all questions and answers have been exposed on the page.

In the form of FIG. 5 the user will manipulate the flaps 76 and 78 in the same manner normally using the pad 80 of disposable sheets for writing his answers. The slidable connection at 82 hinges the flap 78 to the supporting panel 84 in the location between the bound pad of printed sheets and the pad of disposable sheets.

In each form the questions as well as the answers are successively undercovered and in this way the double masking avoids any risk of distracting a user's attention. This may be the case if the complete list of questions is to be fully exposed at all times.

It will also be noted as indicated at 71 that the upper edges of flaps 70, 74 (FIG. 4) and 76, 78 (FIG. 5) in these two forms are in lowered offset position similarly to the offset at 21 of flap 20 shown by FIG. 1.

Most conveniently, where both question and answer flaps are provided, as in these alternative forms, each page, as it is finished may be turned upwardly and out of the way without exposure of the written material of the next succeeding underlying page. This is done simply by sliding the bottom edge of the topmost page upwardly from its flat position and past the top edges of the flaps until it is free of the flaps. Then before the topmost page is turned back on the spiral wire, the flaps can be pushed upwardly to their uppermost positions. Accordingly, inadvertent exposure of the contents of the next page may be entirely avoided when the top page is turned back. The offset as will be seen may be approximately at the bottom edge of the pages of the bound pad and so expose the lowermost question or answer without, however, permitting the separation of the hinged sliding connection of the mating interfaces joining the flaps to the assembly. Thus the flaps may be easily manipulated for return to their full masking relation overlying the material of the next page.

What is claimed is:

1. A binder construction for "program teaching" which comprises a pair of hinged cover panels, a hinge member secured along one edge portion to a free edge portion of one of said cover panels, a flexible masking flap connected to the free edge portion of said hinge member for sliding movement longitudinally thereof to extend over the inner face of said one panel and means for releasably retaining a bound pack of programmed sheets on said one panel with a free edge of the sheets adjacent said hinge member to position the pack of sheets in underlying relation to said masking flap, said retaining means comprising a pocket carried by said one panel, opening to the hinged edge thereof for receiving the cover member of the pack binding.

2. A device for use in "program teaching" comprising a mounting member for fitting said device in predetermined relation to a bound pack of program sheets, a slideway extending along one edge of said member adjacent and in parallel relation to an unbound edge of said program sheets, a masking flap having slideway engaging means extending along its outer edge for substantially the full length of said masking flap, said flap, including its slideway engaging means, being sufficiently flexible to drape when unsupported, the other edges at the inner side and at the top and bottom ends of said masking flap being free at their extreme edges to enable an underlying topmost program sheet of a pack to be lifted upwardly against said free end edges and cause said edegs to swing upwardly and outwardly for the masking flap to fall under said sheet and into masking relation on the next topmost sheet of the pack.

3. A device for use in "program teaching" as set forth in claim 2 in which said slideway and slideway engaging means comprise dovetail rib and groove portions interconnected in overlapping relation on the upper surface of the mounting member, the grooves being open ended, and further in which said flap, when in full masking position over program material, lies entirely within limits defined by the edges of said mounting member.

4. A device for use in "program teaching" comprising a mounting member fitting said device in predetermined relation to a bound pack of program sheets, said mounting member including a slideway arranged along an edge of said member and disposed adjacent to, and in parallel relation with, an unbound edge of the program sheets, a masking flap member of pliant flexible material having slideway engaging means also of pliant flexible material extending along substantially the full length of the outer side edge of said flap member and slidably connected with said slideway, said engaging means being fully engaged when in full masking position of said flap member, the inner edge and the top and bottom ends of the flap member being free at their extreme edges for upward and outward swinging movement of the free end edges of the flap when a program sheet is swung upwardly from the top of said bound pack so that said flap slides away and falls below said sheet onto the pack, said flexible engaging means extending beyond the end of the slideway in partially unmasking positions of the flap and in said latter positions draping with said flexible flap over the underlying edge of said mounting member.

5. A device for use in "program teaching," which comprises a panel member having a portion for supporting a plurality of bound program sheets, a hinge member connected to the upper surface of said panel member along an edge thereof, a flap member of limply flexible material slidably connected along one edge to the free edge portion of said hinge member for sliding movement longitudinally thereof, the body of said flap extending in masking relationship over an unbound edge of program sheets positioned on said sheet supporting portion of said panel, the flexible material of the flap facilitating withdrawal of an immediately underlying sheet with a minimum of exposure of the program material on the succeeding sheet, the edges of the flap opposite said slidably connected edge and at the top and bottom ends of the flap being free at their extreme edges to enable an underlying topmost program sheet of a pack to be lifted upwardly against said free edges and said edges to swing outwardly and upwardly and the masking flap to fall below said sheet and into masking relation over the next topmost sheet of the pack, the slidably connected edge portion of said flap also being flexible and when fully engaged being in substantially coextensive relation with said free edge portion of the hinge member, and, in partially unmasked positions of the flap extending beyond the end of said hinge portion to drape freely together with the body of said flap over the underlying edge of said panel member.

6. A binder construction for bound packs of "program teaching" sheets which comprises a pair of hinged cover panels, a slideway extending along an edge of one of said cover panels, a highly flexible masking flap having flexible connecting means extending along its outer edge for substantially the full length of the flap and slidably engaging said slideway, the inner edge and the top and bottom ends of said flap being free at their extreme edges for hinged swinging movement of the flap upwardly and outwardly when a sheet of the pack is swung upwardly on its binding against said flap and said free edges fall away from said sheet to mask the next sheet of the pack, and means for releasably retaining a bound pack of program sheets on said one panel with a free edge of the sheets adjacent said slideway to position the pack of sheets in underlying relation to said masking flap.

7. A binder construction as set forth in claim 6 in which the slideway is on the upper surface of said one panel and said retaining means comprises a pocket carried by said one panel for receiving the cover member of the pack binding.

(References on following page)

References Cited in the file of this patent

UNITED STATES PATENTS

| | | |
|---|---|---|
| 2,190,625 | Jolly | Feb. 13, 1940 |
| 2,234,075 | Carolin | Mar. 4, 1941 |
| 2,310,725 | Widder | Feb. 9, 1943 |
| 2,628,435 | Minninger | Feb. 17, 1953 |
| 2,645,041 | Merrill | July 14, 1953 |
| 2,841,109 | Marty | July 1, 1958 |
| 2,925,670 | French | Feb. 23, 1960 |
| 3,054,195 | Palmer | Sept. 18, 1962 |